United States Patent [19]

Do

[11] Patent Number: 5,966,187
[45] Date of Patent: Oct. 12, 1999

[54] PROGRAM GUIDE SIGNAL RECEIVER AND METHOD THEREOF

[75] Inventor: Young-Soo Do, Suwon, Rep. of Korea

[73] Assignee: Samsung Electronics Co., Ltd., Suwon, Rep. of Korea

[21] Appl. No.: 08/621,464

[22] Filed: Mar. 25, 1996

[30] Foreign Application Priority Data

Mar. 31, 1995 [KR] Rep. of Korea .................. 95/7525

[51] Int. Cl.$^6$ .................................................. H04N 7/14
[52] U.S. Cl. ..................... 348/584; 348/906; 348/563; 348/564; 455/3.2
[58] Field of Search ..................... 348/906, 563, 348/564, 565, 568, 584, 13; 455/3.2; H04N 7/14

[56] References Cited

U.S. PATENT DOCUMENTS

| | | | |
|---|---|---|---|
| 5,353,121 | 10/1994 | Young et al. | 348/563 |
| 5,523,796 | 6/1996 | Marshall et al. | 348/906 |
| 5,532,754 | 7/1996 | Young et al. | 348/563 |
| 5,550,576 | 8/1996 | Klosterman | 348/906 |
| 5,557,338 | 9/1996 | Maze et al. | 348/565 |
| 5,559,550 | 9/1996 | Mankovitz | 348/906 |
| 5,585,838 | 12/1996 | Lawler et al. | 348/13 |
| 5,596,373 | 1/1997 | White et al. | 348/906 |
| 5,642,153 | 6/1997 | Chaney et al. | 348/906 |
| 5,650,826 | 7/1997 | Eitz | 348/906 |
| 5,657,072 | 8/1997 | Aristides et al. | 348/906 |

OTHER PUBLICATIONS

VideoGuide, Inc., "Video Guide User's Manual", Part #030–10011 rev. 1.0, pp. 11–19, 1995.
RCA DRD203RW Satellite Receiver, RCA Company.

Primary Examiner—John K. Peng
Assistant Examiner—Linus H. Lo
Attorney, Agent, or Firm—Staas & Halsey

[57] ABSTRACT

A device for receiving a digital broadcasting satellite (DBS) signal, includes a controller for generating a first signal for selecting a program guide signal included in the DBS signal and a second signal for selecting one of a plurality of programs which are included in the program guide signal, in response to input of certain key signals; a decoder for decoding the program guide signal in response to the first signal; a storing unit for separating and storing the decoded program guide signal as position data, channel data and video data; a signal compressing unit for compressing the video data corresponding to the second signal; a mixer for mixing the decoded program guide signal as a main screen signal with the compressed video data as a sub-screen signal; and a display unit for displaying the signals mixed by the mixer.

20 Claims, 3 Drawing Sheets

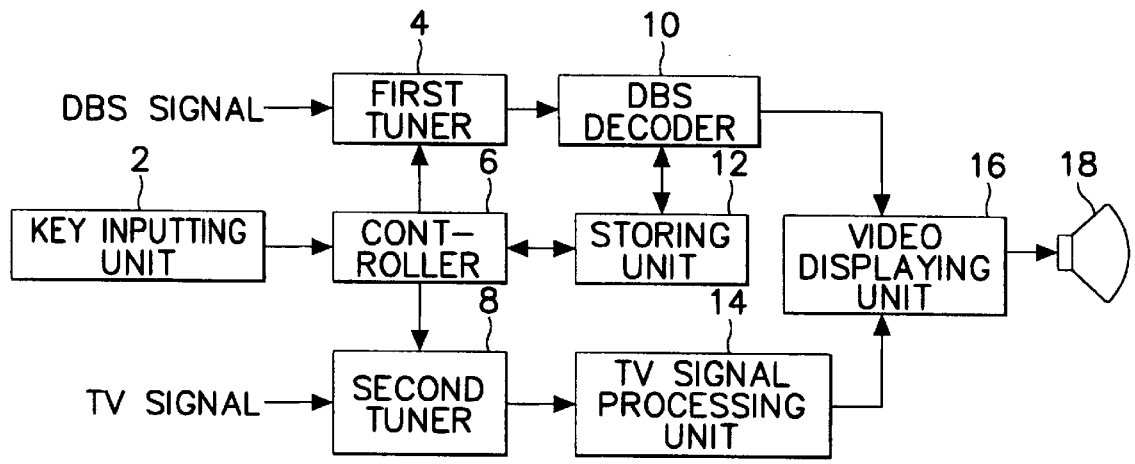
FIG. 1 PRIOR ART
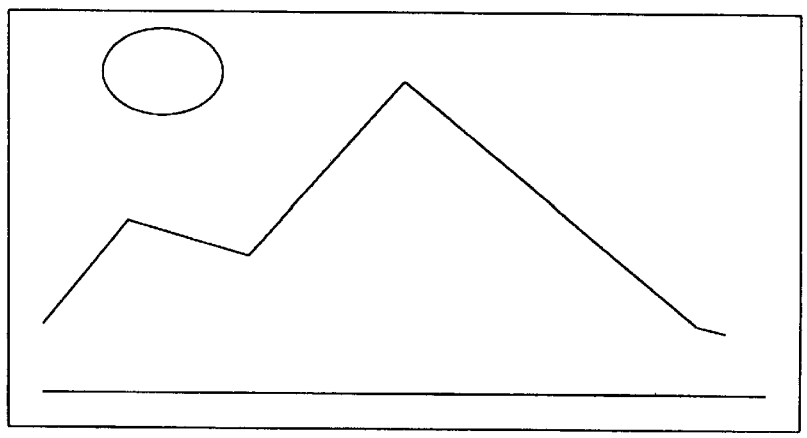
FIG. 2A PRIOR ART
FIG. 2B PRIOR ART

PROGRAM GUIDE SIGNAL RECEIVER AND METHOD THEREOF

BACKGROUND OF THE INVENTION

1. Field of the Invention

The present invention relates to a device for receiving a broadcasting satellite signal and method thereof. More particularly, it relates to a program guide signal receiver for receiving and processing a program guide signal included in a digital broadcasting satellite (DBS) signal.

Korean Patent Application No. 7525/1995 is incorporated herein by reference for all purposes.

2. Description of the Related Art

A broadcasting satellite signal receiver is a telecommunication apparatus for receiving a video image of a moving or stationary object transmitted at a remote distance without a significant time delay, transmitted either via an electromagnetic wave or an electrical signal. A television set generally receives and processes a television signal (hereinafter "TV signal"), and it can also receive a digital broadcasting signal (hereinafter "DBS signal") transmitted via a satellite, if a DBS signal receiver is installed in the television set.

The DBS signal includes a DBS video signal and a program guide signal. The program guide signal is a signal for a broadcasting service in which information about program content to be broadcast by a broadcast station is displayed using characters on a screen according to the channel on which the program will be broadcast and the time that it will be broadcast so that a user can freely watch a desired program by using a remote controller, etc. A digital broadcasting signal receiver (DRD 203RW) commercially sold in June 1994 by the RCA company, U.S.A. is known to be a product which includes a program guide service function.

FIG. 1 is a block diagram illustrating construction of a conventional satellite broadcasting signal receiver.

The conventional satellite broadcasting signal receiver includes a key inputting unit 2 which has a plurality of keys associated with a TV signal receiving mode, a DBS signal receiving mode and a program guide signal receiving mode. When a user depresses one of the keys, a key signal corresponding to the depressed key is input to a controller 6. A remote controller is a representative example of key inputting unit 2.

In the case where the DBS signal receiving mode is set by controller 6, a first tuner 4 receives the DBS signal, and a DBS decoder 10 decodes the received DBS signal. In the case where the TV signal receiving mode is set by controller 6, a second tuner 8 receives the TV signal, and a TV signal processing unit 14 converts the received TV signal into a signal which can be displayed. A storing unit 12 extracts the program guide signal included in the DBS signal, which is decoded by DBS decoder 10 under the control of controller 6, and stores the program guide signal as position data, channel data and graphic data.

The position data indicates the position on the display in which information about a program is displayed. Position data is determined by controller 6 according to the order in which the programs are displayed. The position data function is an interface between controller 6 and a user when the program guide is displayed. For example, if the user, using a remote controller (not shown), causes the cursor to move from program A to program B on a main screen, the position data corresponding to the position of information about program B on the display can be recognized and acknowledged by controller 6. Accordingly, controller 6 can acknowledge a status of the cursor positioned on program B. As a result, the DBS decoder 10 can tune to a channel corresponding to program B, or display channel information on a sub-screen as shown in FIG. 2B. The graphic data corresponds to a video picture of the program. That is, it corresponds to data related to a font, a color and a brightness of the program information to be displayed, as shown in FIG. 2A.

A video displaying unit 16 responds to the DBS signal decoded by DBS decoder 10 or to the TV signal processed by the TV signal processing unit 14. Video displaying unit 16 drives a cathode ray tube 18 (hereinafter "CRT") so that the decoded DBS signal or the TV signal is displayed on the CRT 18.

FIGS. 2A and 2B are drawings illustrating displays of the program guide signal displayed on the CRT 18 after being processed by the apparatus shown in FIG. 1. FIG. 2A is a drawing illustrating the program guide signal displayed in response to the user's selection of the program guide signal receiving mode, and FIG. 2B is a drawing illustrating the content of a program displayed in response to the user selecting from the displayed program guide signal, a desired broadcasting program.

Referring to FIGS. 1, 2A and 2B, operations for displaying the received DBS and TV signals on the CRT 18 are described below.

If the TV signal receiving mode is selected, the TV signal received by the second tuner 8 is processed to generate a signal adapted for display by the TV signal processing unit 14, and that signal is then displayed on the CRT 18 via the video displaying unit 16.

On the other hand, if the DBS signal receiving mode is selected, the DBS signal received by the first tuner 4 is decoded by DBS decoder 10, and the decoded signal is then displayed on the CRT 18 via the video displaying unit 16. At this time, if the user selects the program guide signal receiving mode by means of the key inputting unit 2, the controller 6 separates the program guide signal from the DBS signal decoded by the DBS decoder 10 and stores the separated data as position data, channel data and graphic data in a storing unit 12. Also, after the controller 6 reads the position data, channel data and graphic data which represent the program guide signal stored in the storing unit 12, the position data, channel data and graphic data read from storing unit 12 are output to the video displaying unit 16 via the DBS decoder 10. Then, the video displaying unit 16 drives the CRT 18 to display the program guide signal on the CRT 18, which may be displayed in the form of an initial screen, as shown in FIG. 2A. However it may be represented somewhat differently according to the content of the transmission from the broadcast station.

If the user selects a program corresponding to a particular channel and time from the program guide signal displayed on the CRT 18, as shown in FIG. 2A, with key inputting unit 2, the screen associated with the content of the selected program is displayed on the CRT 18. This process is known as confirming the contents of the selected program. For example, as shown in FIG. 2B, if channel 2 and a time of 8 o'clock are selected, the initial screen shown in FIG. 2A is erased and then the screen associated with the content of a "program D" is displayed. The program selected by the user can be the program which is being broadcast at the time the user makes the selection or it can be a program that will be broadcast in the future. In the case of a selected program which is being broadcast at the time of selection, the controller 6 controls the first the tuner 4 to tune to the channel so that the selected program is displayed on the screen. On the other hand, in the case where a program to be broadcast in the future has been selected, after the controller 6 reads the video data corresponding to a particular time which is stored in the storing unit 12, the video data is displayed on the CRT 18. The video data is included in the DBS signal together with the program guide signal.

If confirmation of the content of one program is completed through the above-described procedure, the user can confirm the content of other programs by utilizing the key inputting unit 2. However, the user can not select the desired program until the program content screen reverts to the initial screen for confirming program content, as shown in FIG. 2A, in order to confirm the contents of other programs. Accordingly, in the case of confirming the contents of a plurality of programs, there has been a problem in which the initial screen and the program content screen should be alternately displayed, thereby making it inconvenient for a user to use the apparatus.

SUMMARY OF THE INVENTION

It is therefore an object of the invention to provide a broadcasting satellite signal receiver capable of easily confirming the contents of a program from a program guide signal included in a digital broadcasting satellite signal.

To achieve this object, there is provided a broadcasting satellite signal receiver according to the present invention, in which the program guide signal included in the digital broadcasting satellite signal is displayed on a main screen, and in the case where a selection signal for confirming the program content from the displayed program guide signal is input, the selected program content is displayed on a sub-screen of the main screen.

Moreover, there is provided a broadcasting satellite signal receiver according to the present invention, in which a signal associated with the program content included in a DBS signal or a TV signal is displayed on the sub-screen, in the case that the signal associated with the program content selected for confirmation is included in the DBS signal or the TV signal presently being received. On the other hand, in the case where a selected program will be broadcast in the future, the program content previously stored in a storing unit is read and then displayed on the sub-screen.

Furthermore, there is provided a program guide signal receiver for use in a device for receiving a TV signal including a first plurality of programs and a digital broadcasting satellite (DBS) signal including a program guide signal including information identifying a second plurality of programs and a digital video signal including the second plurality of programs, the receiver comprising: a controlling unit for generating a first signal for selecting the program guide signal included in the DBS signal and a second signal for selecting a program from one of the first and second plurality of programs included in the TV signal and the digital video signal, respectively, in response to inputting certain key signals; a decoder for decoding the program guide signal in response to the first signal and outputting a decoded program guide signal; a storing unit for separating and storing the information included in said decoded program guide signal, wherein the information includes video data; a compressing unit for compressing one of the first plurality of programs of the TV signal which corresponds to the program selected based on the second signal, for compressing one of the second plurality of programs of the digital video signal which corresponds to the program selected based on the second signal, and for compressing the video data stored in the storing unit in the case where a program corresponding to the second signal is not present in the TV signal and the digital video signal; a mixer for mixing the decoded program guide signal as a main screen signal with one of the TV signal, the digital video signal, and the video data stored in the storing unit, which corresponds to the second signal and which is selectively compressed by the compressing unit, as a sub-screen signal; and a display for displaying the signals mixed by said mixer.

BRIEF DESCRIPTION OF THE DRAWINGS

The following is a detailed description of the invention with reference to the attached drawings, in which like reference numerals indicate the same or similar elements;

FIG. 1 is a block diagram illustrating a conventional broadcasting satellite signal receiver.

FIGS. 2A and 2B are drawings illustrating the program guide signal processed by the conventional receiver shown in FIG. 1.

DETAILED DESCRIPTION OF THE PREFERRED EMBODIMENT

The following description is given within the limits of the case in which a user selects a program guide signal receiving mode, in order to prevent obscurity of the present invention.

Figure 3:
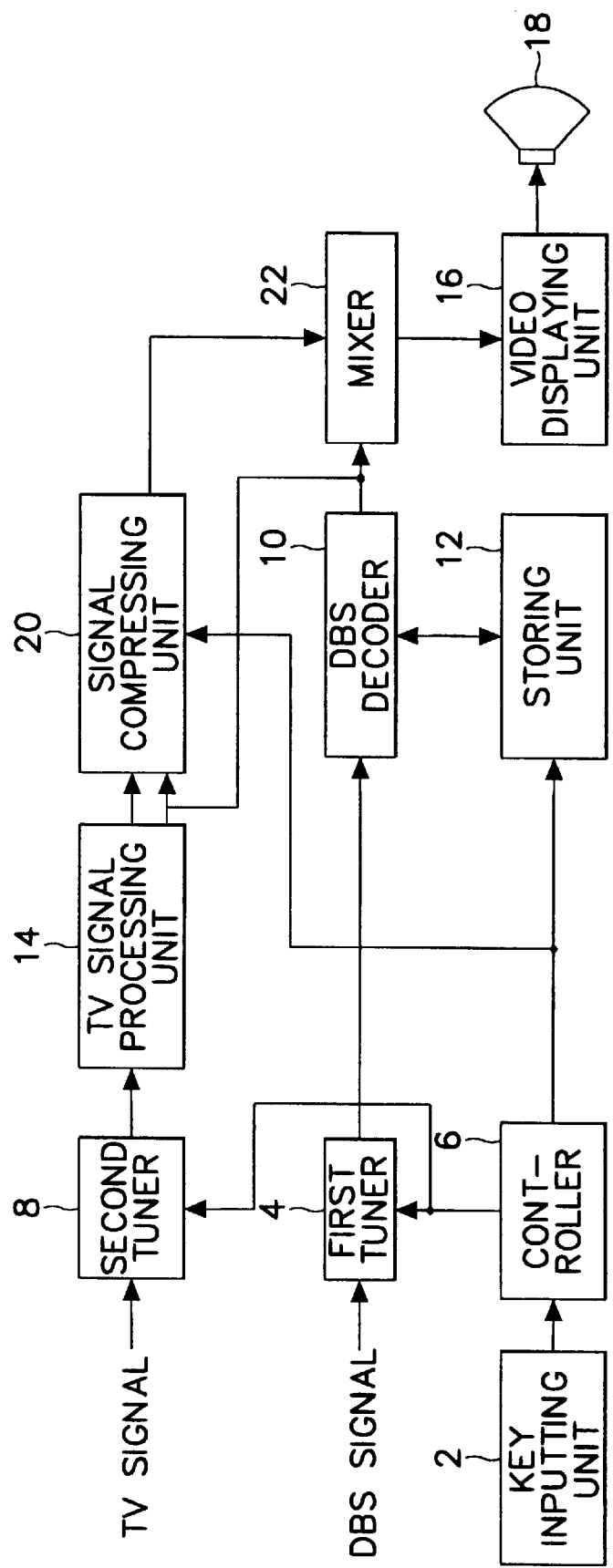
FIG. 3 is a block diagram illustrating a broadcasting satellite signal receiver according to an embodiment of the present invention.

FIG. 3 is a block diagram illustrating a broadcasting satellite signal receiver according to an embodiment of the present invention.

A controller 6 recognizes a signal for selecting a digital broadcasting satellite signal receiving mode (hereinafter "DBS selection signal"), a signal for selecting a TV signal receiving mode (hereinafter "TV selection signal") or a signal for selecting a program guide mode (hereinafter "program guide selection signal") , which are generated by a use selecting and depressing a certain key of a key inputting unit 2. A first tuner 4 tunes to a DBS signal in response to input of the DBS selection signal, and a DBS decoder 10 decodes a program guide signal and a DBS video signal which are included in the DBS signal. On the other hand, a second tuner 8 tunes to a TV signal in response to input of the TV selection signal, and a TV signal processing unit 14 converts the tuned TV signal to a signal adapted for display. A storing unit 12 stores the program guide signal included in the DBS signal decoded by DBS decoder 10 as position data, channel data and graphic data. A signal compressing unit 20 compresses the TV signal converted to a display signal by TV signal processing unit 14, or it compresses the DBS video signal which is included in the DBS signal decoded by the DBS decoder 10. A mixer 22 mixes a signal selectively compressed by the signal compressing unit 20 the TV signal or the DBS video signal) with the program guide signal included in the DBS signal decoded by the DBS decoder 10. A video displaying unit 16 drives a cathode ray tube (CRT) 18 to display on the CRT 18 the signals mixed by the mixer 22, the output of which is input to a video displaying unit 16.

Figures 4A, 4B:
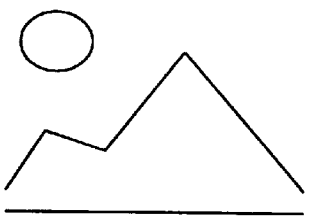
FIGS. 4A and 4B are drawings illustrating the program guide signal processed by the receiver shown in FIG. 3.

FIGS. 4A and 4B illustrates the program guide signal displayed on the CRT 18 after being processed by the receiver shown in FIG. 3. FIG. 4A represents a form of the program guide signal, and FIG. 4B represents the program content included in the program guide signal.

The broadcasting satellite signal receiver shown in FIG. 3 is set to the program guide receiving mode when the program guide selection signal is received from the key inputting unit 2. Thus, the controller 6 enables the first tuner 4 to be tuned so that the DBS signal is decoded by the DBS decoder 10. At this time, the program guide signal included in the DBS signal decoded by DBS decoder 10 is displayed on the CRT 18 via the video displaying part 16, as shown in FIG. 4A. In other words, the program guide signal is displayed on a main screen, and the program content is displayed on a sub-screen. In this case, as shown in FIG. 4A, a void space is displayed on the sub-screen since a program has not been selected. Controller 6 displays the program guide signal in the form shown in FIG. 4A. At the same time, the controller 6 extracts the program guide signal included in the DBS signal to thereby separate and store the program guide signal as position data, channel data and graphic data in storing unit 12.

Next, if the user utilizes the key inputting unit 2 to select a channel and a time with the aid of the program guide signal displayed on the CRT 18 as in the form shown in FIG. 4A, a screen showing the contents of the selected program is displayed on the sub-screen of the CRT 18. For example, if channel 2 and 8o'clock are selected, the content screen for "program D" is displayed on the sub-screen, as shown FIG. 4B.

A program which is being broadcast or which will be broadcast in the future may be selected by the user. If the program being broadcast is selected by the user, the controller 6 controls the first tuner 4 or the second tuner 8 to tune to the channel so that the selected program is displayed. In other words, in the case where the selected program is included in the DBS signal, the first tuner 4 is tuned, and in the case where the selected program is included in the TV signal, the second tuner 8 is tuned.

On the other hand, in the case where the program that will be broadcast in the future is selected, the controller 6 reads video data relating to a particular time which is stored in the storing unit 12 and then displays video data on the sub-screen of the CRT 18. This video data represents the program content in a terse manner and is data which was previously stored as the program contents in the storing unit 12. The information displayed in the subscreen is generally character data, i.e., data corresponding to a plot, a performer or the viewing time of the program. However, the specific information displayed in the subscreen depends on the type of signal transmitted by the sender. Accordingly, a still image can be displayed in the subscreen for a program which is to be broadcast in the future.

As discussed above, the user watches the displayed program included in the program guide signal and then selects the desired program, such that the program guide signal is displayed on the main screen and the desired program is displayed on the sub-screen of the CRT 18, thereby making it easy for the user to confirm the contents of a plurality of programs. That is, the present invention provides the advantage that the user can confirm the contents of a plurality of programs on the screen of the program guide signal without repeatedly confirming the program guide signal and the program contents.

While there have been illustrated and described what are considered to be the preferred embodiments of the present invention, it will be understood by those skilled in the art that various changes and modifications may be made, and equivalents may be substituted for elements thereof without departing from the true spirit and scope of the present invention.

What is claimed is:

1. A program guide signal receiver employed in a digital broadcasting satellite (DBS) signal receiver for receiving a digital broadcast satellite signal which includes a program guide signal containing information including video data about a plurality of programs, said program guide receiver comprising:

a controller to generate a first signal for selecting the program guide signal and a second signal for selecting one of the plurality of programs included in the program guide signal, in response to inputting one or more key signals;

a decoder to decode said program guide signal selected in response to said first signal and to output a decoded program guide signal;

a storing unit to separate and store the information contained in the program guide signal decoded by said decoder;

a compressing unit to compress the video data corresponding to the program selected based on said second signal;

a mixer to mix said decoded program guide signal as a main screen signal with said compressed video data as a sub-screen signal; and a display to display said main screen signal and said sub-screen signal.

2. The program guide signal receiver as claimed in claim 1, wherein the information included in the program guide signal further comprises position data, channel data, and graphic data.

3. The program guide signal receiver as claimed in claim 1, further comprising a tuner to tune said DBS signal in response to said first signal.

4. A program guide signal receiver employed in a device for receiving a digital broadcasting satellite (DBS) signal which includes a program guide signal which includes information identifying a plurality of programs and a digital video signal including the plurality of programs, said program guide signal receiver comprising:

a controller to generate a first signal for selecting the program guide signal included in the DBS signal and a second signal for selecting one of the plurality of programs included in the digital video signal and identified by the program guide signal, in response to inputting certain key signals;

a decoder to decode said program guide signal selected in response to said first signal and to output a decoded program guide signal;

a storing unit to separate and store the information included in said decoded program guide signal, wherein the information includes video data;

a compressing unit to compress the digital video signal corresponding to the program selected according to said second signal, and to selectively compress the video data stored in said storing unit when the digital video signal corresponding to the program selected according to said second signal is not present within the digital video signal of the DBS signal;

a mixer to mix said decoded program guide signal as a main screen signal, with one of said digital video signal corresponding to the program selected according to said second signal and compressed by said compressing unit and said video data stored in said storing unit and selectively compressed by said compressing unit, as a sub-screen signal; and a display to display said main screen signal and said sub-screen signal.

5. The receiver as claimed in claim 4, wherein the information included in said decoded program guide signal further comprises position data, channel data, and graphic data.

6. The receiver as claimed in claim 4, further comprising a tuner for tuning said DBS signal in response to said first signal.

7. A program guide signal receiver for use in a device for receiving a TV signal including a first plurality of programs and a digital broadcasting satellite (DBS) signal including a program guide signal including information identifying programs of at least one of the first plurality of programs and a second plurality of programs and a digital video signal including the second plurality of programs, said receiver comprising:

a controlling unit to generate a first signal for selecting the program guide signal included in the DBS signal and a second signal for selecting a program from one of the first and second plurality of programs included in the TV signal and the digital video signal, respectively, in response to inputting certain key signals;

a decoder to decode the program guide signal in response to said first signal and to output a decoded program guide signal;

a storing unit to separate and store the information included in said decoded program guide signal, wherein said information includes video data;

a compressing unit to compress one of the first plurality of programs of the TV signal which corresponds to the program selected based on said second signal, to compress one of the second plurality of programs of the digital video signal which corresponds to the program selected based on said second signal, and to compress the video data stored in said storing unit when the program corresponding to said second signal is not present in the TV signal or the digital video signal;

a mixer to mix said decoded program guide signal as a main screen signal with the one of the TV signal, the digital video signal, and said video data stored in said storing unit, which corresponds to said second signal and which is selectively compressed by said compressing unit, as a sub-screen signal; and a display to display said signals mixed by said mixer.

8. The receiver as claimed in claim 7, wherein the information included in said decoded program guide signal further comprises position data, channel data, and graphic data.

9. The receiver as claimed in claim 7, wherein said mixer mixes said decoded program guide signal with the TV signal if the program selected by said second signal is present in the TV signal, with the digital video signal if the program selected by said second signal is present in the digital video signal, and with the video data if the program is not present in either the TV signal or the digital video signal.

10. The receiver as claimed in claim 7, further comprising a first tuner to tune said DBS signal in response to said first signal generated by said controlling unit.

11. The receiver as claimed in claim 7, further comprising a second tuner for tuning said TV signal in response to said second signal generated by said controlling unit.

12. A method for operating a program guide signal receiver employed in a device for receiving a TV signal including a first plurality of programs and a digital broadcasting satellite (DBS) signal including a program guide signal including information identifying the first plurality of programs and a second plurality of programs and a digital video signal including the second plurality of programs, said method comprising the steps of:

generating a first signal for selecting the program guide signal included in the DBS signal;

generating a second signal for selecting a program from one of the first and second plurality of programs included in the TV signal and the digital video signal, respectively, in response to inputting certain key signals;

decoding the program guide signal in response to said first signal and outputting a decoded program guide signal;

separating and storing the information included in said decoded program guide signal, wherein said information includes video data;

compressing one of (i) one of the first plurality of programs of the TV signal which corresponds to the program selected based on said second signal, (ii) one of the second plurality of programs of the digital video signal which corresponds to the program selected based on said second signal, and (iii) said video data stored in said storing unit when a program corresponding to said second signal is not present in the TV signal or the digital video signal;

mixing said decoded program guide signal as a main screen signal with said one of the TV signal, the digital video signal, and said video data stored in said storing unit, which corresponds to said second signal and which is selectively compressed by said compressing unit, as a sub-screen signal; and displaying said signals mixed by said mixer.

13. A program guide signal receiver to receive a broadcast signal including a program guide signal indicative of a program guide of a plurality of programs and a video signal having the plurality of programs, the program guide signal receiver comprising:

a controller to receive a first input to display the program guide, and a second input to select one of the plurality of programs from the displayed program guide if the first input has been received;

a mixer to mix the program guide signal and the video signal of the selected program, to generate mixed signals; and a display to simultaneously display the program guide and the selected program, using the mixed signals.

14. The program guide signal receiver as claimed in claim 13, wherein said controller receives a new second input to select a new one of the plurality of programs, said mixer mixes the program guide signal and the new video signal of the newly selected program, and the display simultaneously displays the program guide and the newly selected program.

15. The program guide signal receiver as claimed in claim 13, wherein the broadcast signal is a digital broadcasting satellite (DBS) signal and the program guide signal receiver further receives a television signal including a second plurality of programs, said controller receives the second input to select a program from one of the plurality of programs and the second plurality of programs.

16. The program guide signal receiver as claimed in claim 13, wherein the program guide signal includes corresponding data relating to the plurality of programs, the program guide signal receiver further comprising a storing unit to store the corresponding data relating to the plurality of programs, said mixer mixes the program guide signal and the data corresponding to the selected program if the video signal of the selected program is not present in the broadcast signal, and said display simultaneously displaying the program guide and the data corresponding to the selected program.

17. The program guide signal receiver as claimed in claim 13, wherein said display displays the program guide in a main portion and the selected program in a sub-screen portion.

18. The program guide signal receiver as claimed in claim 16, wherein said display displays the program guide in a main portion and the selected program or the data corresponding to the selected program in a sub-screen portion.

19. A program guide signal receiver to receive a broadcast signal including a program guide signal indicative of a program guide of a plurality of programs and including corresponding data relating to the plurality of programs, and a video signal having the plurality of programs, the program guide signal receiver comprising:

a controller to receive a first input to display the program guide, and a second input to select one of the plurality of programs from the displayed program guide if the first input has been received;

a storing unit to store the corresponding data relating to the plurality of programs;

a mixer to mix the program guide signal and the data corresponding to the selected program, to generate mixed signals; and a display to simultaneously display the program guide and the data corresponding to the selected program, using the mixed signals.

20. A program guide signal receiver to receive a broadcast signal including a program guide signal indicative of a program guide of a plurality of programs and including corresponding data relating to the plurality of programs, and a video signal having the plurality of programs, the program guide signal receiver comprising:

a controller to receive a first input to display the program guide, and a second input to select one of the plurality of programs from the displayed program guide if the first input has been received;

a storing unit to store the corresponding data relating to the plurality of programs;

a mixer to mix the program guide signal and the data corresponding to the selected program, to generate mixed signals; and a display to simultaneously display the program guide and the data corresponding to the selected program, using the mixed signals if the second input has been received, and displaying the program guide and a blank region indicative of no selection of any program of the program guide, if the second input has not been received.

* * * * *